(12) United States Patent
Branch et al.

(10) Patent No.: US 9,942,103 B2
(45) Date of Patent: Apr. 10, 2018

(54) PREDICTING SERVICE DELIVERY METRICS USING SYSTEM PERFORMANCE DATA

(71) Applicant: International Business Machines Corporation, Armonk, NY (US)

(72) Inventors: Joel W. Branch, Hamden, CT (US); Yixin Diao, White Plains, NY (US); Emi K. Olsson, Germantown, NY (US); Amitkumar M. Paradkar, Mohegan Lake, NY (US); Rajeev Puri, Huntersville, NC (US); Larisa Shwartz, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 14/015,007

(22) Filed: Aug. 30, 2013

(65) Prior Publication Data
US 2015/0067140 A1  Mar. 5, 2015

(51) Int. Cl.
G06F 15/173 (2006.01)
H04L 12/24 (2006.01)

(52) U.S. Cl.
CPC ........ *H04L 41/147* (2013.01); *H04L 41/5038* (2013.01); *H04L 41/5074* (2013.01)

(58) Field of Classification Search
CPC ......... G06Q 10/06375; G06Q 10/06; H04L 41/147; H04L 41/5028; H04L 51/5074

(Continued)

(56) References Cited

U.S. PATENT DOCUMENTS 7,076,695 B2    7/2006  McGee
7,617,313 B1 *  11/2009 Washburn et al. .......... 709/224
(Continued)

FOREIGN PATENT DOCUMENTS

EP    1420344        5/2004
WO    WO2005008404 A2  1/2005
WO    WO2011088256 A2  7/2011

OTHER PUBLICATIONS

Google Scholar Search Result. Search string "project server configuration based on load and ticket . . . " (Nov. 19, 2017).*

(Continued)

*Primary Examiner* — Tan Doan
(74) *Attorney, Agent, or Firm* — Louis J. Percello; Otterstedt, Ellenbogen & Kammer, LLP

(57) ABSTRACT

A method for predicting a computerized service delivery organization workload including collecting data of a computer implementing service delivery routine including overlapping samples of load values, overlapping samples of performance values, overlapping samples of event outputs, ticket values and ticket volumes, building a first correlation of said load values with said performance values for predicting new performance values based on new data, building a second correlation of said performance values with said event outputs, said ticket values and said ticket volumes, combining said first and second correlations into a third correlation for correlating said load values with a ticket volume and an event volume, and determining at least one projected event volume or projected ticket volume value using said third correlation and at least one projected load value of said computer.

12 Claims, 8 Drawing Sheets

(58) Field of Classification Search
USPC .......................................................... 709/224
See application file for complete search history.

(56) References Cited

U.S. PATENT DOCUMENTS

2002/0133757 A1    9/2002  Bertram
2008/0046266 A1*   2/2008  Gudipalley et al. .............. 705/1
2013/0182700 A1*   7/2013  Figura et al. ................. 370/352

OTHER PUBLICATIONS

Laura Wynter et al., "Parameter inference of queuing models for IT systems using end-to-end measurements". Proceedings of Sigmetrics/Performance Conference, Jun. 2004, pp. 408-409.

Joel Branch et al., "A universal method for composing business transaction models using logs". Proceedings of the IEEE International Symposium on Integrated Network Management, Jun. 2009, pp. 17-24.

Kevin Passino et al., "Fuzzy Control". Addison Wesley Press, Sep. 1997, pp. i-iii and 73-77.

* cited by examiner

US 9,942,103 B2

PREDICTING SERVICE DELIVERY METRICS USING SYSTEM PERFORMANCE DATA

BACKGROUND

The present disclosure relates to predicting service delivery workloads, and more particularly to predicting service delivery metrics using projected system configurations, load, and performance.

A growing number of Information Technology (IT) system (including applications and services) owners/operators want to know the ramifications of (1) increased (user) request loads on their systems and (2) growth or other changes in IT infrastructure. There are solutions that predict the system performance given such projected loads and configurations. However, these fall short of helping an operator understand what projected effort in service delivery will be needed to address and potentially remediate any problems arising from projected user loads and configurations.

BRIEF SUMMARY

According to an exemplary embodiment of the present disclosure, a method for predicting a computerized service delivery organization workload including collecting data of a computer implementing service delivery routine including overlapping samples of load values, overlapping samples of performance values, overlapping samples of event outputs, ticket values and ticket volumes, building a first correlation of said load values with said performance values for predicting new performance values based on new data, building a second correlation of said performance values with said event outputs, said ticket values and said ticket volumes, combining said first and second correlations into a third correlation for correlating said load values with a ticket volume and an event volume, and determining at least one projected event volume or projected ticket volume value using said third correlation and at least one projected load value of said computer.

According to an exemplary embodiment of the present disclosure, a method for predicting service delivery workload including receiving a projected system load for a known server configuration, determining that a load value of said projected system load correlates to performance data of said computer system, and estimating said workload using a correlation model correlating said load value with a ticket volume and an event volume.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Having an estimate of service delivery effort can help one plan how to address future planning scenarios, e.g., in helping determine if one should buy more servers or pay some additional cost for service response capabilities. Service delivery effort can be estimated via the analysis of events and tickets from either humans (e.g., system administrators) or software/hardware based monitoring agents. Such events and tickets, that largely drive a service delivery organization's work, serve to describe things like errors/incidents and change requests for a given computer system. As used herein, a system can include applications, services, and/or machines.

Embodiments of the present disclosure relate to predicting service delivery metrics (e.g., workloads) using system configuration, load, and performance data. A service delivery metric can define a workload of a service delivery group (e.g., in IT strategic outsourcing). In some exemplary embodiments, event/ticket volumes can be predicted using a model of IT system configuration, load, and performance data. As described herein, service delivery metrics can include various elements and are not limited to the exemplary elements (e.g., ticket volumes) described here.

According to an exemplary embodiment of the present disclosure, a model of predicting IT system service delivery metrics includes correlation of data including: (1) historical system loads, such as the amount, rate, and distribution of requests for a given resource (e.g., software or service); (2) historical system performance measurements (such as utilization and response time) associated with the system loads; (3) application/infrastructure configurations such as software/hardware configurations (e.g., CPU type, memory); and (4) historical system event (e.g., alerts) and/or ticket data (e.g., incidents and alerts) associated with the operation of IT infrastructure elements that are associated with the data above. Particular models can include one or more of the elements listed above, or other elements. That is, as described herein, models can include various elements and are not limited to those exemplary elements described here.

Figure 1:
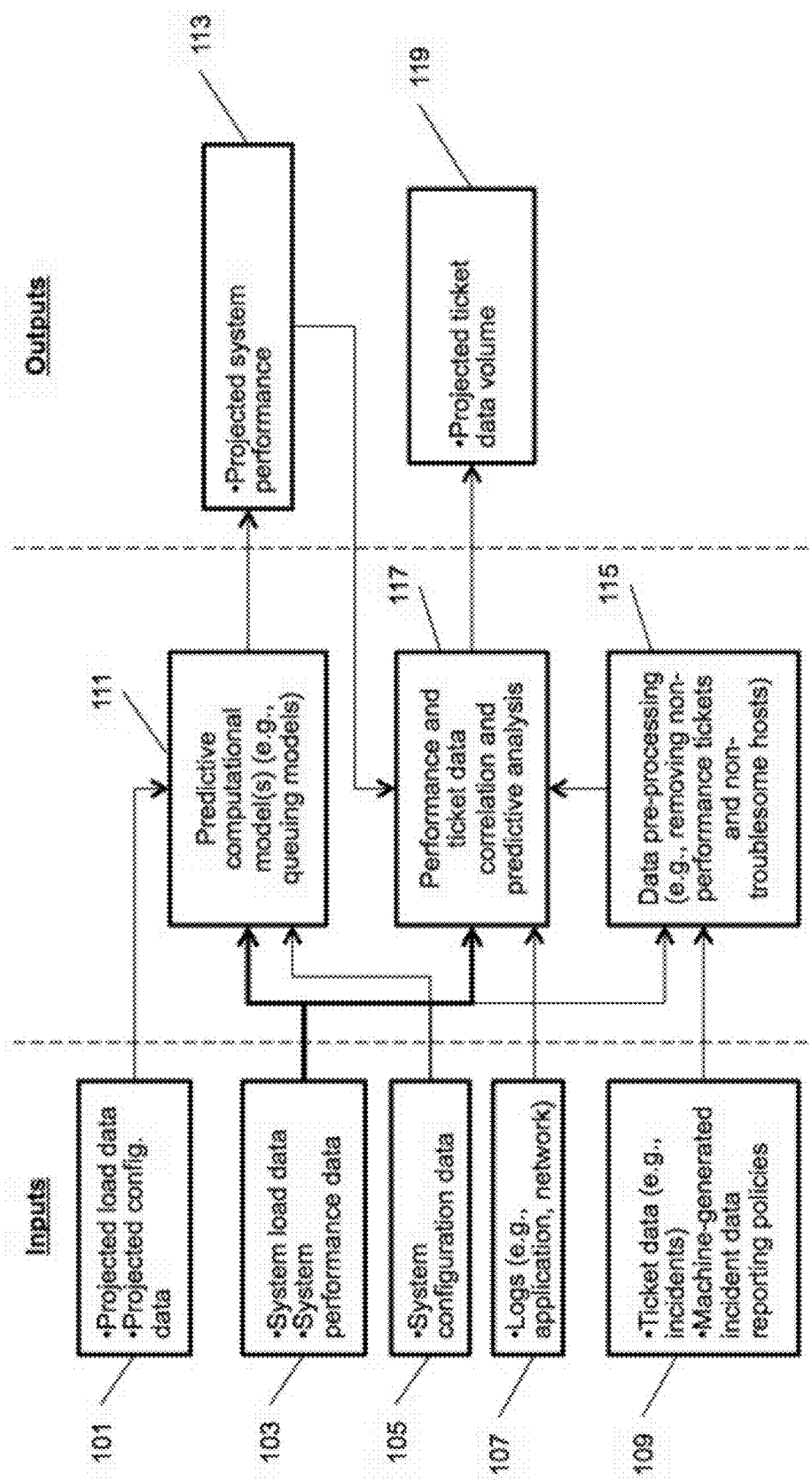
FIG. 1 is a flow diagram of a method for predicting service delivery metrics according to an exemplary embodiment of the present disclosure.

Referring to FIG. 1, according to an exemplary embodiment of the present disclosure, the processes in block 115 and block 117 describe methods for the analysis of enterprise IT event/ticket data, including (1) how the data is prepared/pruned to reduce the size of the data set and identify data relevant for predicting service delivery metrics, and (2) how certain data features are used in machine learning classification and prediction algorithms for the sake of predicting service delivery metrics. Further, the combination of queuing and regression analysis techniques is used to predict ticket volumes.

One may choose to bypass the use of queuing models altogether and rely on broader statistical analysis of data from direct observations. However, queuing as described herein and in the references for this disclosure can be used to understand how the addition of a new machine will affect system performance and in turn, affect ticket volumes in the context of an interdependent IT infrastructure.

Figure 2:
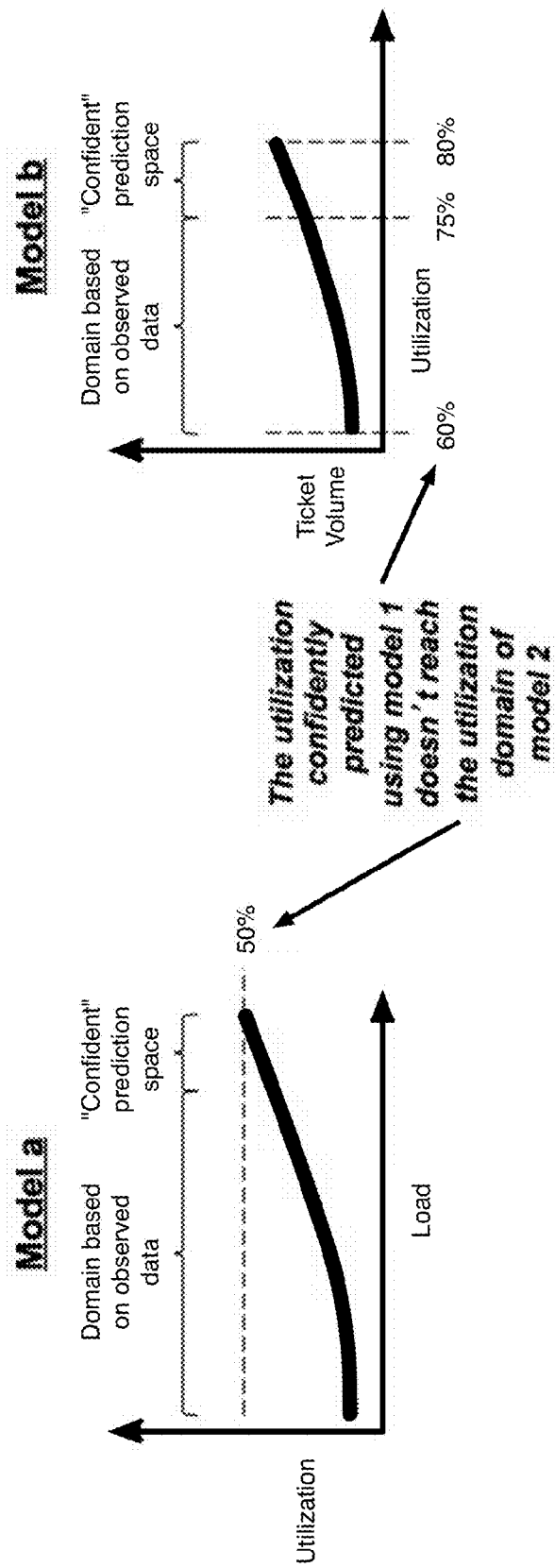
FIG. 2 illustrates a challenge in combining load to utilization and utilization to ticket volume models according to an exemplary embodiment of the present disclosure.

FIG. 2 illustrates a challenge in combining load-to-utilization and utilization-to-ticket models. That is, in a scenario where a load-to-utilization model is based on one domain of measurements (e.g., data samples supporting confident prediction up to 50% utilization) and the utilization-to-ticket model is based on a nearly separate measurement domain (e.g., data samples supporting confident prediction between 60% and 80% utilization). Thus, combining these models in a straightforward manner, i.e., plugging regression Model A into regression Model B, is not guaranteed to yield confident results.

Returning to FIG. 1, at block 101, projected load and configuration data (as opposed to data that has been explicitly observed) is used as input into a model (e.g., a queuing system model) to help predict system performance.

At block 103, sample correlated system load data and performance data are used to parameterize computational models (e.g., queuing-based models). The computational models are used for predicting system performance for projected inputs, e.g., that described in connection with block 101.

At block 105, system configuration data is also used to parameterize computational models for predicting system performance. Additionally, the computational models can be used, in combination with ticket data, to identify machine types that don't produce many tickets at all.

At block 107, log data containing artifacts of when some user/process accessed a resource (e.g., service, application, or network port) on a given machine is input in the model. The log data can be used to measure load on a given machine.

At block 109, ticket data overlapping (i.e., sampled over the same time period and environment) with data in block 103 is used to predict service delivery metrics for some projected load and configuration. Ticket generation policies describe rules for how automated monitoring agents generate events and tickets given system performance measurements.

At block 111, predictive computational model (e.g., a queuing-based model) enables prediction of system performance metrics given inputs from blocks 101, 103, and 105. The predictive computational model can implement known methods/techniques (for example, see: Parameter inference of queuing models for IT systems using end-to-end measurements. Laura Wynter, Cathy Xia, and Fan Zhang. *Proceedings of SIGMETRICS/Performance Conference*, June 2004) where a prediction model is built based on general (Kelly-type) queuing networks, queuing network parameter inference techniques, and benchmark data from a real IT system, e.g., the data identified in blocks 101, 103, and 105. These methods further use the notion of experiments, e.g., sets of end-to-end delay measurements collected under certain system loads. An optimal parameter setting for the queuing network produces (Ee, pe) such that the following value is found:

$$\min\|(Em,pm)-(Ee,pe)\|$$

where,
Em is the measured end-to-end delay;
pm is the measured server utilization;
Ee is the estimated end-to-end delay; and
pe is the estimated server utilization.

Total response times (e.g., sum of multiple visits) is estimated as follows:

$Tji=vji(sji/(1-pim))$ if I is a processor sharing station in a queuing network and $Tji=vji(sji)$ if i is an infinite server queue station in a queuing network where,
vji is the number of times a class j job visits station i,
sji=E[Sji] where Sji are i.i.d random service demands (general distribution) at station i by class j job, and
Ee is then a linear function of Tji based on how a class j job is routed through an IT system.

The exemplary predictive computational model above is based on a nesting procedure. In an exemplary nesting procedure, the solution vector x is obtained for a given experiment n, and then a subset of x is considered for experiment n+1. The subset of interest is in the intersection of set of feasible solution to the current n+1 problem and the set of optimal solutions to the previous n problem, and so on.

At block 113, projected performance is output of the predictive computational model of block 111.

At block 115, an event/ticket pre-processing component removes events/tickets (from the processes) that are not dependent on system load or performance, e.g., tickets describing login credential problems, printer defects, patch requests for compliance, etc.

At block 117, a data correlation/prediction analysis component generates a model (e.g., defined via at least one regression analysis technique) describing the relationship among data in block 103, block 105 and block 109. Data points used in estimating the relationship may be restricted according to event/ticket generation policies from block 109. Data from block 113 is input into the model to generate projected, or predicted, event/ticket volumes. Log data from block 107 is used for incorporating system load data from an alternative source.

At block 119, projected event/ticket volume is output by the model of block 117.

Figure 3:
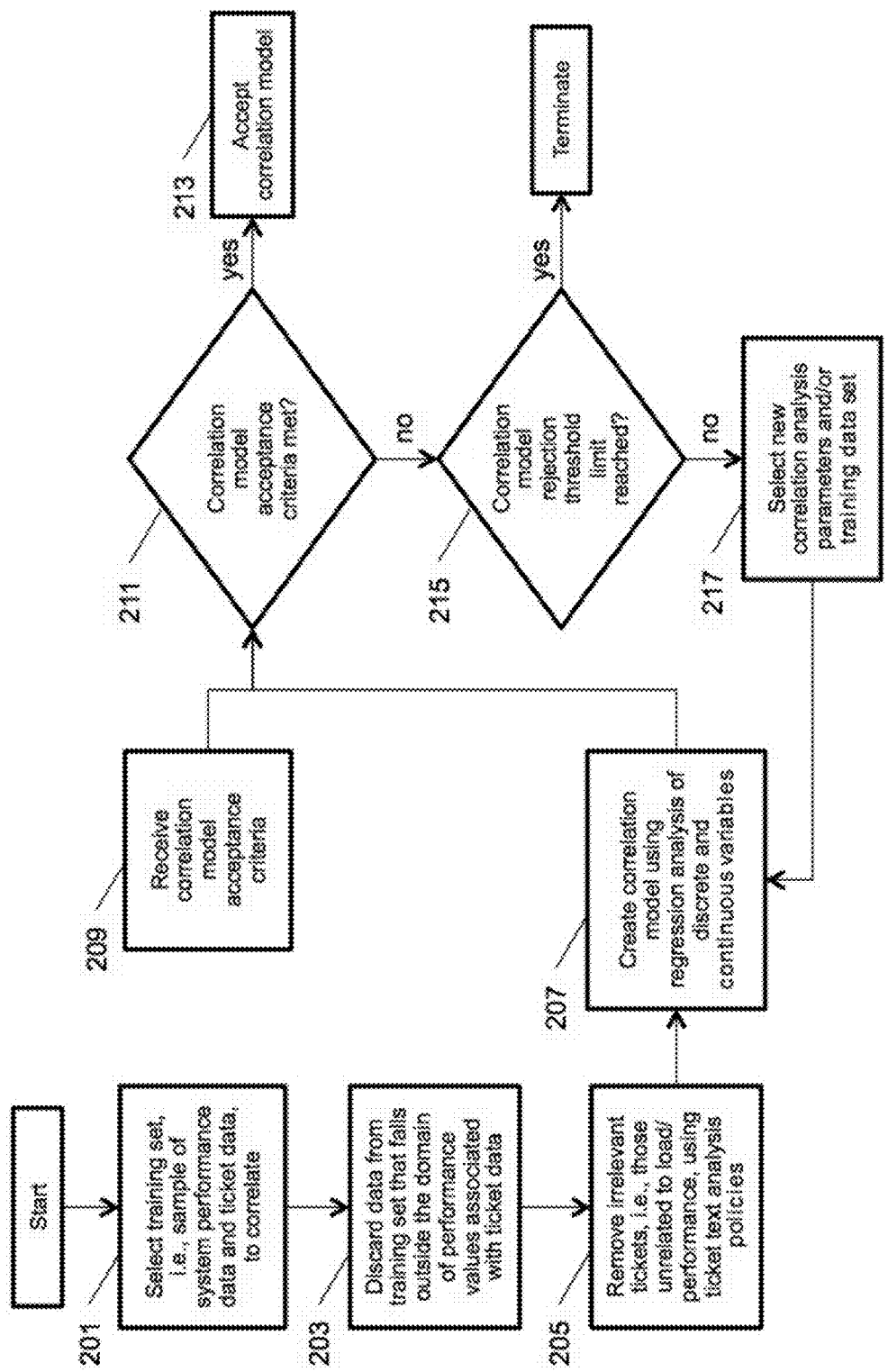
FIG. 3 is a flow diagram of a method for determining ticket volume using system properties, load, and performance according to an exemplary embodiment of the present disclosure.
Figure 4:
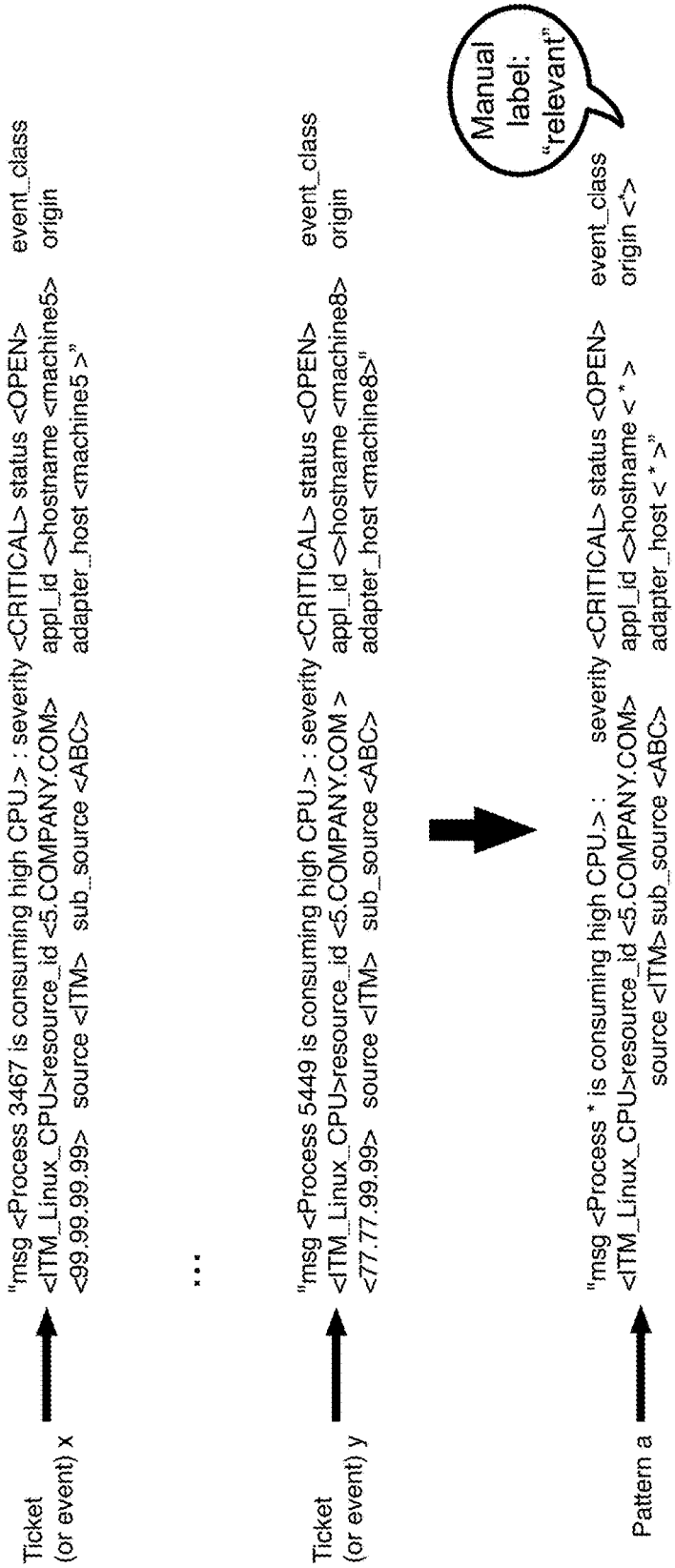
FIG. 4 shows an example of event/ticket pattern extraction according to an exemplary embodiment of the present disclosure.

Referring to block 117 and FIG. 3, the determination of the projected event/ticket volume includes selecting a training set at block 201. The training set can be a sample of system performance data and ticket data, to correlate, etc. At block 203 a domain may be defined by ticket generation policies used by automatic monitoring agents (e.g., no tickets will be generated below a given performance threshold). That is, data from training set that falls outside the domain of performance values associated with ticket data is discarded. This pruning can be performed because there is little or no value in using non-associated data points (e.g., a performance value that's not associated with any observable ticket) in developing useful correlation models (e.g., that to be developed in block 207).

At block 205, examples of irrelevant tickets include those describing printer problems, or password problems. The irrelevant tickets are unrelated to performance behavior and hence can reduce the quality of correlation analysis. Exemplary methods for identifying such tickets are described herein.

In some exemplary embodiments of the present disclosure, a supervised learning approach is used to train a classifier, e.g., a support vector machine, to recognize relevant tickets. A simple binary classification can be used, where the class set includes {relevant, irrelevant}.

Exemplary data attributes include the source of a ticket (e.g., some app support group or software component) or key words extracted from the description field.

In some exemplary embodiments of the present disclosure, for the source of a ticket (for a preferred embodiment), if the ticket source was a performance monitoring probe, then it can be classified as "relevant"; if the source was some security monitoring probe, then it will be "irrelevant." A set of policies (e.g., if-then-else statements) can be written to perform such a labeling.

In some exemplary embodiments of the present disclosure, for keyword extraction, a pattern analysis technique (also helping reduce data volume) is used. The pattern analysis technique (for example, see: A universal method for composing business transaction models using logs. Joel Branch, Chatschik Bisdikian, Starsky Wong, Dakshi Agrawal. *Proceedings of the IEEE International Symposium on Integrated Network Management*, June 2009.) simplifies the class labeling process. This is applicable to machine generated events/tickets since pattern of event/ticket content is well structured. The pattern analysis technique includes (1) dividing the ticket/event descriptions into groups of equal number of words/tokens (e.g., words or other items of ticket that can be identified via text delimiters); (2) forming subgroups of similar ticket/event descriptions (within each group of equal number of words/tokens) using a measure of similarity such as "Hamming distance"; (3) discarding words from descriptions that weren't (highly) similar among descriptions (i.e., tokens in identical positions in different description text that are not equal); (4) using words in remaining patterns as features to train the classifier. Afterward, the patterns are manually labeled (e.g., as relevant or irrelevant) and a classifier is trained. Examples of such classifiers include neural networks and support vector machines. Once the classifier is trained, the resulting model can be used to classify other "non-labeled" tickets/events.

Additionally, statistics regarding the ticket resolution time (e.g., mean and standard deviation), complexity (i.e., the degree of skill required in addressing an issue described in the ticket), and priority can be used as a feature or independent variable for classification or used to prune away non-relevant tickets before classification. The notion being that tickets marked with low priority or having required extremely low service times (e.g., less than 5 minutes to service) can be considered "non-actionable," e.g., typically requiring a negligible amount of effort on behalf of a service delivery organization and hence having no significance in the prediction model.

At block 207, for the regression problem in FIG. 3, the dependent variable is ticket volume. In some exemplary embodiments, the independent variables are represented by (1) hardware/software properties of a machine, and (2) the performance of a machine (e.g., CPU or memory utilization). Here, the dependent variable is a continuous value, hence the use of regression. The independent variables, however, can be a mix between discrete (categorical) and continuous. Various alternative methods for solving such a regression problem are disclosed herein.

In some exemplary embodiments of the present disclosure, at block 207, a singular regression model for discrete and continuous features is implemented using a single statistical regression model. For example, consider the problem of determining ticket volume based on the properties CPU utilization and server operating system. The regression model can be represented as follows:

$$Y' = a + b_1 X_1 + b_2 X_2 + b_3 X_1 X_2$$

where:

$Y'$ is the ticket volume;

$X1$ is the continuous independent variable for CPU utilization;

$X2$ is the discrete independent variable for the server's operating system;

$X2$ is represented as a numeric value using an effect coding method (e.g., either −1 or 1 for Windows or Linux). Effect coding is used over the alternative dummy coding since it allows comparison of each discrete feature with each other, as opposed to just comparison with a "reference" feature value, as with the dummy coding technique;

$XiXj$ are products of variables and represent the effect of the interaction between the variables the example regression model ($1 \leq i,j \leq 2$); and a and bk ($1 \leq k \leq 3$) are coefficients in a regression model.

One can solve the equation above (e.g., finding a and b1 ... b3) using a software package such as IBM SPSS or MathWorks MATLAB (which may solve the equation using a technique such as gradient descent or least squares). The same approach can be used with more server features (e.g., more discrete variables), but the equation can become more difficult to solve due to increased computational complexity.

Figure 5:
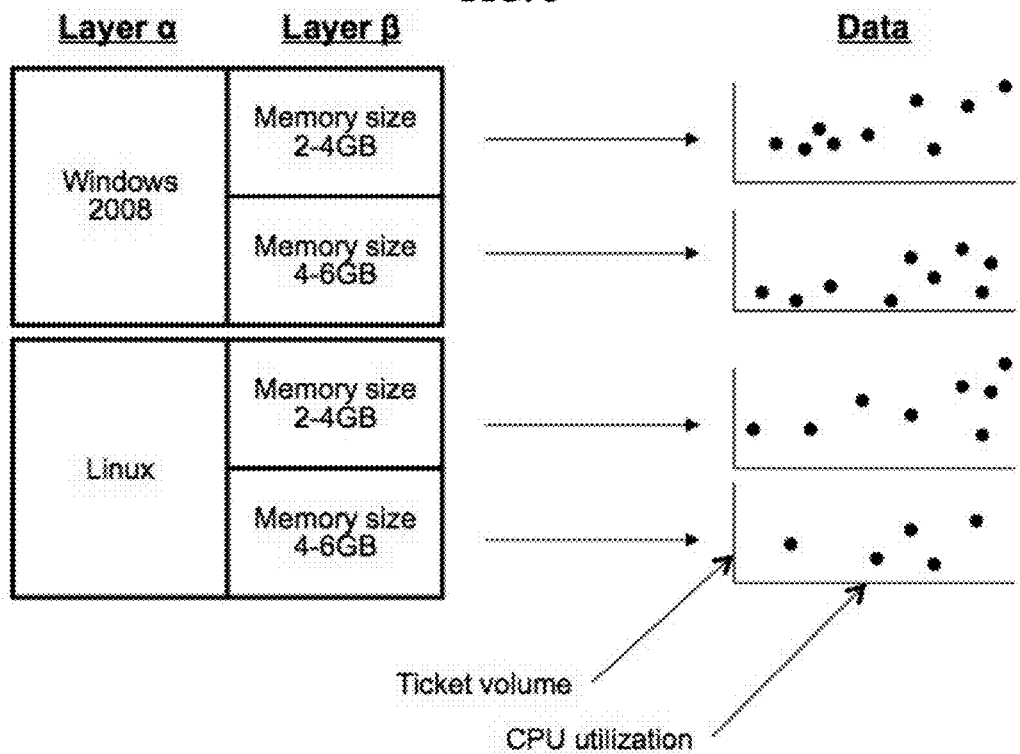
FIG. 5 is an illustration of a dictionary lookup-based regression model for correlating discrete and continuous features according to an exemplary embodiment of the present disclosure.

At block 207 and FIG. 5, alternatives to the regression problem can be implemented. For example, according to some embodiments of the present disclosure, a dictionary lookup-based regression model for discrete and continuous features is implemented. That is, in a case where a single regression model is deemed too complex, a multi-layer regression modeling process can be used where individual regression models are organized by independent variables. Consider an exemplary 2-layer regression process in which the first layer is organized by one or more discrete independent variables, e.g., server OS, hosted application, etc. The second layer is then organized by continuous independent variables, e.g., CPU utilization, memory size, etc. It is within this layer that individual regression models (based on only a single independent and dependent variable) would reside.

Hence, overall, an example regression model can be written as:

$$Y'_{\alpha,\beta} = a + b X_{\alpha,\beta}$$

where:

$Y'\alpha,\beta$ is the ticket volume (dependent variable) for a given $\alpha$ and $\beta$;

$X\alpha,\beta$ is the CPU utilization (independent variable) for a given $\alpha$ and $\beta$;

$\alpha$ represents a set of values for the first layer of the regression model; $\alpha=\{$Windows 2008, Linux$\}$;

$\beta$ represents a set of values for the second layer of the regression model; $\beta=\{$memory size 2-4 GB, memory size 4-6 GB$\}$; and a and b are coefficients.

Again, one can solve the equation above using a statistical or machine learning software package.

Figure 6:
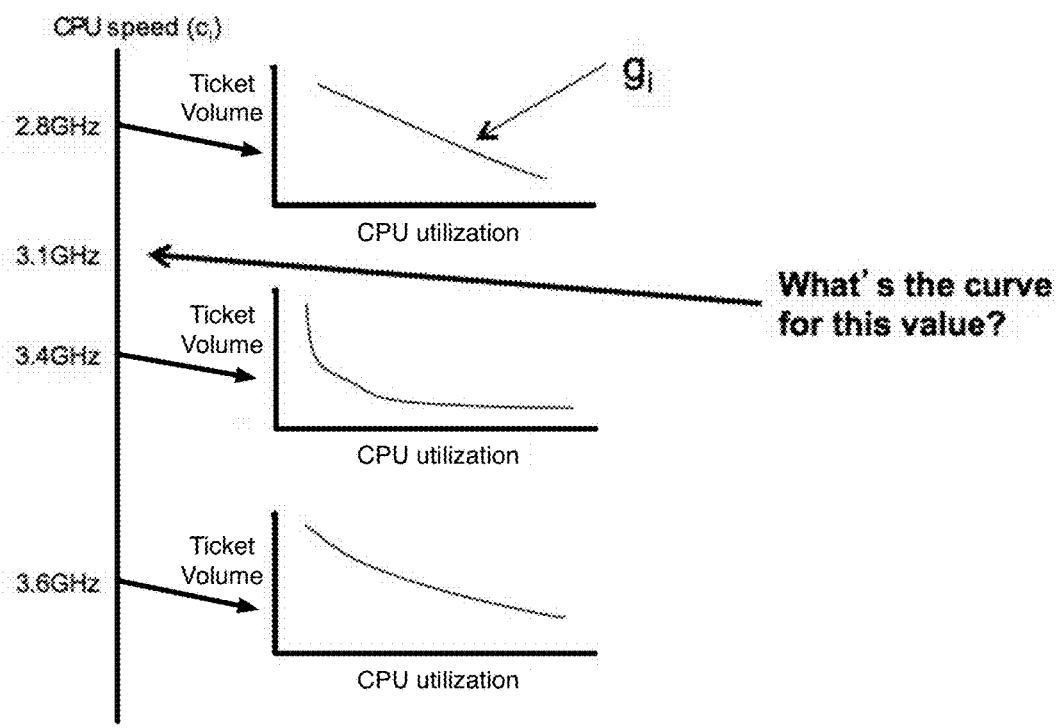
FIG. 6 is an illustration of an interpolation-based regression model for continuous features according to an exemplary embodiment of the present disclosure.

At block 207 and FIG. 6, further alternatives to the regression problem can be implemented. For example, according to some embodiments of the present disclosure, interpolation-based regression model for continuous features can be used where adding more features (discrete or continuous) to the regression model of FIG. 5 may increase complexity beyond a point of feasibility.

In this case, to find the curve (or at least an approximation) of the regression line at an interpolated value of an independent variable (e.g., CPU speed of a machine), the Takagi-Sugeno fuzzy system (for example, see: Fuzzy Control. Kevin Passino and Stephen Yurkovich, Addison Wesley Press, September 1997) can be implemented as a method to approximate interpolated curves (i.e., regression models). The fuzzy system can be expressed as follows:

$$y = F_{ts}(x, \Theta) = \frac{\sum_{i=1}^{R} g_i(x)\mu_i(x)}{\sum_{i=1}^{R} \mu_i(x)}$$

$$g_i(x) = a_{i,0} + a_{i,1}x_1 + \ldots + a_{i,n}x_n$$

$$\mu_i(x) = \prod_{j=1}^{n} \exp\left(-\frac{1}{2}\left(\frac{x_j - c_j^i}{\sigma_j^i}\right)^2\right)$$

where:

y is the output of the fuzzy model (e.g., interpolated regression model/curve);

x is the input (e.g., x1 would represent CPU speed and x2 represents utilization);

gi(x) (i=1, 2, ..., R) is the consequent functions of the fuzzy system (i.e., the individual regression models/curves);

ai,j are constants;

cij and σij represent the center and relative widths of the member functions for the jth input and ith function; and Θ is a tuning parameter.

At block 209, at least one acceptance criterion for a correlation model is received. The acceptance criterion is supplied to the system, e.g., by a human operator, to judge the suitability of the correlation model. As an example, a criterion is based on the value of a correlation coefficient in a regression equation (which represents a correlation model) or the root mean squared error value obtained in typical regression model testing, e.g., resulting from 10-fold correlation model testing.

At block 211, it is determined if the correlation model is acceptable given the at least one acceptance criterion described in block 209. An example of an acceptance criterion being met includes, in the case of regression modeling, if the correlation coefficient is larger than a prescribed threshold value and if the root mean squared error value is less than another prescribed threshold value. If the model is accepted given the acceptance criteria block 213 is reached. Otherwise, block 215 is reached and it is checked if the correlation model has been rejected a number of times that is greater than a predefined threshold value. This ensures that the correlation modeling process described with reference to FIG. 3 does not repeat indefinitely. If the threshold limit has been reached the process described in FIG. 3 is finally terminated without the identification of a suitable correlation model. Otherwise, block 217 is reached. Here new model training parameters are selected in an attempt to improve the suitability of the correlation model so that it might pass the criteria described in block 209. An example includes selecting an alternate technique to conduct regression modeling (e.g., using a support vector regression technique as opposed to a Bayesian training or neural network based technique). A further example includes using an alternate kernel in a support vector regression technique (e.g., using a Gaussian as opposed to a linear kernel to better model data that is correlated in a non-linear manner). In some exemplary embodiments, policies for choosing such modeling alternatives are predefined and automatically executed.

Figure 7:
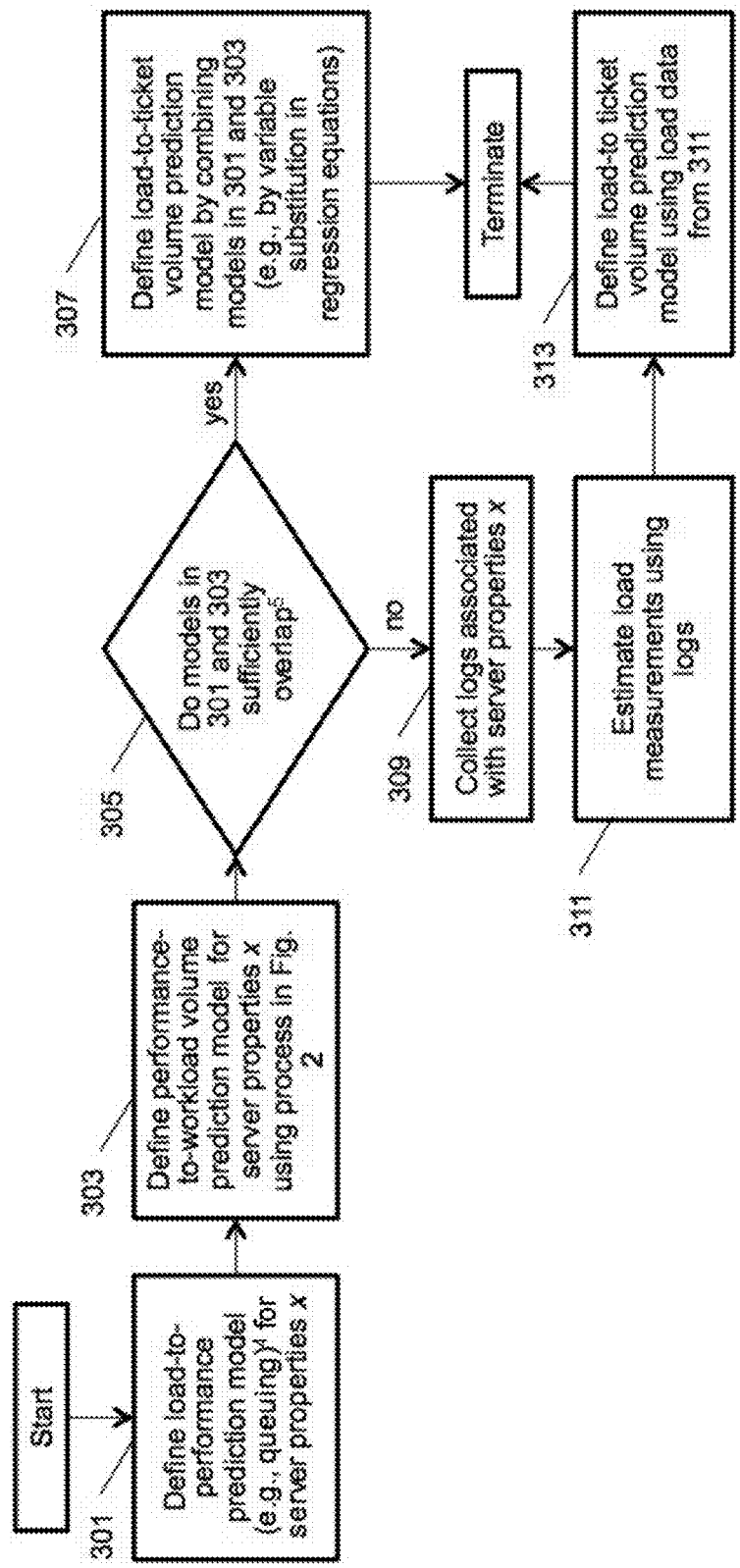
FIG. 7 is a flow diagram of a method for determining ticket volume prediction models based on a combination of predefined prediction models according to an exemplary embodiment of the present disclosure.

Referring now to FIG. 7 and the combination of queuing and regression analysis techniques to predict ticket volumes using load and infrastructure change data, at block 301 a load-to-performance prediction model (e.g., queuing) for server properties x is defined. At block 303, performance-to-workload volume prediction model for the server properties x is defined using the method of FIG. 3.

At block 305, it is determined whether a sufficient overlap between models exists. For example, given some models a and b, assume the use of the following pre-defined threshold value:

threshold_overlap—this defines the minimum percentage of a domain of values that must be shared between models a and b. For instance, referring to FIG. 2, the shared values between two models would be utilization.

The models a and b sufficiently overlap if the following is true:

|[(range_observed(model a) U range_predicted(model a)]∩ [domain_observed(model b) U domain_predicted(model b)]||
>=threshold_overlap·|range_observed(model a) U range_predicted(model a) U domain_observed(model b) U domain_predicted(model b)| where, range_observed(x) is the range of some model x (e.g., regression line) as determined using observed values;

range_predicted(x) is the range of some model x lying in a some "extrapolated" space of the model (e.g., the green lines in FIG. 2);

domain_observed(x) is the domain of some model x (e.g., regression line) as determined using observed values; and domain_predicted(x) is the domain of some model x lying in a some "extrapolated" space of the model (e.g., the green lines in FIG. 2).

In some exemplary embodiments, this means that the set of shared values between models a and b must overlap by at least a set percentage.

At block 307, in a case where the logs sufficiently overlap, a load-to-ticket volume prediction model is defined by combining models in block 301 and block 303 (e.g., by variable substitution in regression equations).

At block 309, in a case where the logs do not sufficiently overlap, logs associated with server properties x are collected. At block 311 of FIG. 7, a measurement of load can be extracted from different log sources and a load-to-ticket volume prediction model is defined at block 313.

Examples include transaction logs and network data logs. Transactions logs may come from an application server such as IBM WebSphere (WAS) or Apache Tomcat. Such logs can contain "events" of when a service was accessed. For example, WAS access log events contain the following data: (1) remote host IP, (2) remote user, and (3) timestamp of a request.

Such data can be used to measure system load in metrics including: requests per second, current number of serviced transactions (if some event marking the end of a transaction is available), etc.

For the "requests per second" metric, a sliding window technique is used where the window size would be 1 second and event timestamps would be used then count how may events occur within a 1 second range.

For the current number of serviced transactions metric, patterns of events explicitly describe the start and stop of a transaction. Assuming the transactions have unique identifiers, one can then use the difference between the timestamp of the start/stop event to determine how long the transaction was in the system. Repeating this task for different transactions, one can then determine how many transactions reside in the system at any one time.

Network logs may come from the operating system (OS) or a network device like a load balancer. Depending on the vendor (of the OS or device), the log may contain various pieces of data. According to an exemplary embodiment of the present disclosure, it is assumed that such a log includes the rate of traffic (e.g., in bytes/sec) for a given source and destination address and port. This traffic rate can be used as a measure of load. Herein, we are interested in loads driven by end users (such as that in block 101 of FIG. 1); all traffic streams may not be associated with that.

Features of both the source and destination address ports of the traffic can be used to identify end user traffic. For example, if one knows which applications on a machine are end user-oriented (e.g., some custom app running in WAS or a business-to-business app installed on the OS), and know what port over which they receive network traffic (easily detectable), then just the traffic statistics related to that port can be used to estimate load for the purposes of this invention.

In some exemplary embodiments of the present disclosure, correlation feature selection is used to determine which network traffic streams affect ticket load. For example, define the features as the traffic streams (and the class) as the ticket volume and use Pearson's correlation to determine the highest "merit" value of a subset of features:

$$merit_s = \frac{k \cdot \text{mean}(r_{cf})}{\sqrt{k + k(k+1) \cdot \text{mean}(r_{ff})}}$$

where,
 k is the size of feature subset;
 mean(rcf) is the average feature-to-class correlation;
 mean(rff) is the average feature-to-feature correlation; and
 (where n is the number of variables) a best-first search algorithm can be used to find the best merit value.

Figure 8:
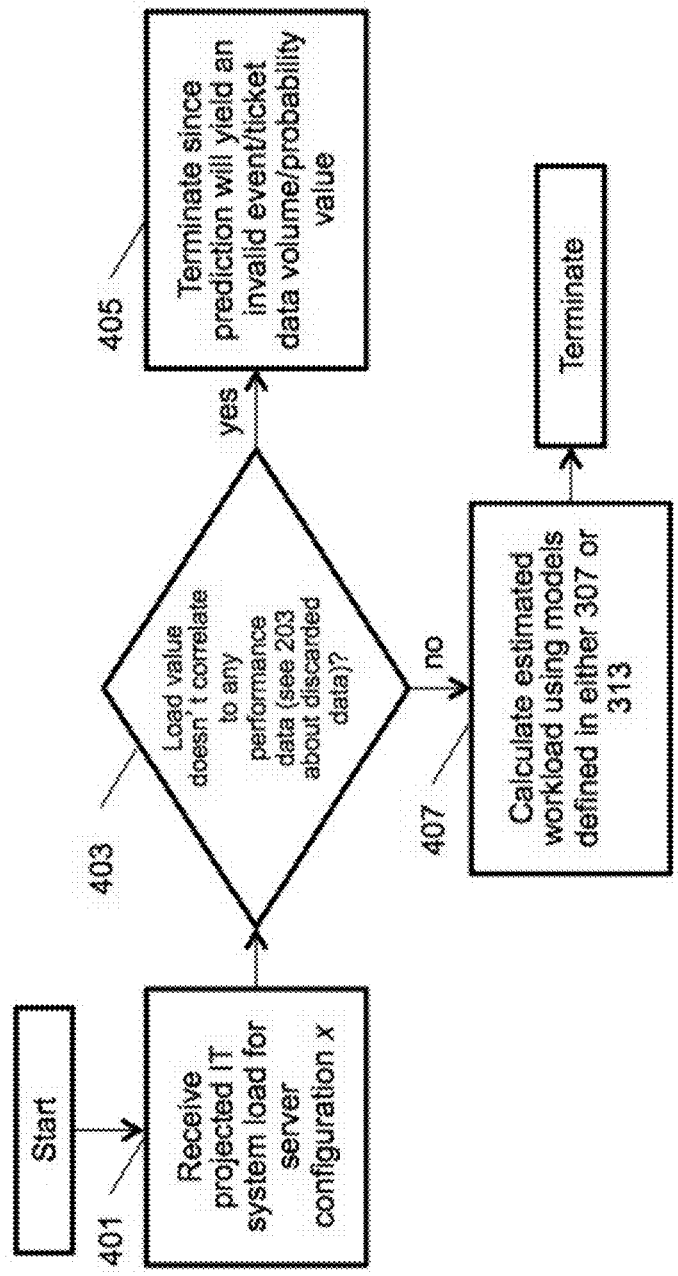
FIG. 8 is a flow diagram of a method for determining ticket volume based on system configuration and load and a predefined model whose development is illustrated in FIG. 7 according to an exemplary embodiment of the present disclosure.

Referring to FIG. 8 and the determination of workload volume based on server load and regression models, at block 401 a projected IT system load for a server configuration x is received. At block 403, it is determined whether the load value correlates to any performance data (here see block 203 in FIG. 3). If the load value correlates to performance data, then at block 407, an estimated workload is determined using the models defined in block 307 and block 311 of FIG. 7. Otherwise, if the load value does not correlate to performance data the method ends at block 405.

It should be understood that the methodologies of embodiments of the disclosure may be particularly well-suited for predicting service delivery metrics using projected system configurations, load, and performance.

By way of recapitulation, according to an exemplary embodiment of the present disclosure, a method for predicting a computerized service delivery organization workload including collecting data of a computer implementing service delivery routine including overlapping samples of load values, overlapping samples of performance values, overlapping samples of event outputs, ticket values and ticket volumes (see for example, FIG. 1, blocks 101, 103, 105, 107, 109), building a first correlation of said load values with said performance values for predicting new performance values based on new data (see for example, FIG. 7, block 301), building a second correlation of said performance values with said event outputs, said ticket values and said ticket volumes (see for example, FIG. 7, block 303), combining said first and second correlations into a third correlation for correlating said load values with a ticket volume and an event volume (see for example, FIG. 7, block 307), and determining at least one projected event volume or projected ticket volume value using said third correlation and at least one projected load value of said computer (see for example, FIG. 8, block 407).

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system for predicting service delivery metrics (see for example, FIG. 1) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that outputs a projected performance using a predictive computational model (for example, FIG. 1: 111), a second module that performs performance and ticket data correlation and predictive analysis (see for example, FIG. 1: 117), a third module that performs data pre-processing (see for example, FIG. 1: 115), and a fourth module that projects ticket volume data (see for example, FIG. 1: 119). Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 9:
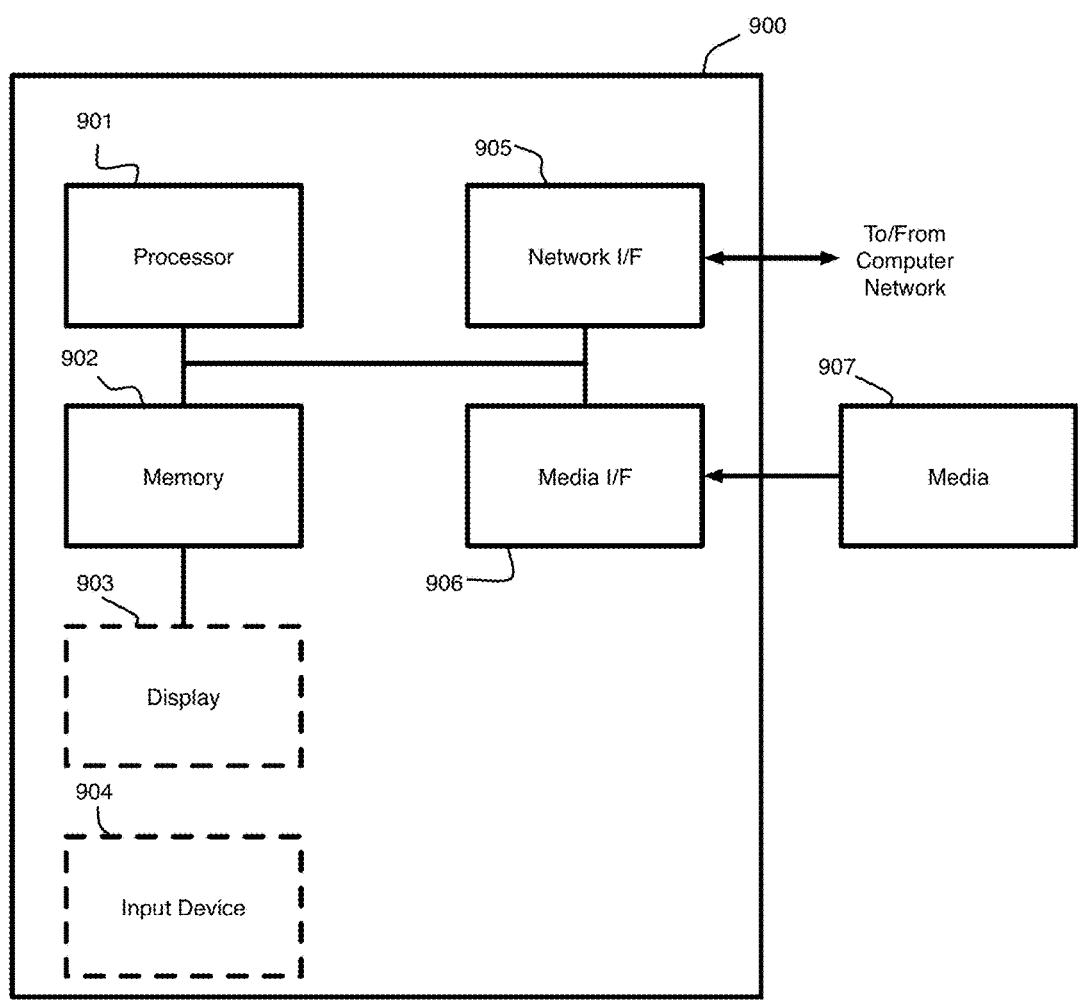
FIG. 9 is a diagram of a system configured to predict service delivery metrics according to an exemplary embodiment of the present disclosure.

For example, FIG. 9 is a block diagram depicting an exemplary computer system for predicting service delivery workloads according to an embodiment of the present disclosure. The computer system shown in FIG. 9 includes a processor 901, memory 902, display 903, input device 904 (e.g., keyboard), a network interface (I/F) 905, a media IF 906, and media 907, such as a signal source, e.g., camera, Hard Drive (HD), external memory device, etc.

In different applications, some of the components shown in FIG. 9 can be omitted. The whole system shown in FIG. 9 is controlled by computer readable instructions, which are generally stored in the media 907. The software can be downloaded from a network (not shown in the figures), stored in the media 907. Alternatively, a software downloaded from a network can be loaded into the memory 902 and executed by the processor 901 so as to complete the function determined by the software.

The processor 901 may be configured to perform one or more methodologies described in the present disclosure, illustrative embodiments of which are shown in the above figures and described herein. Embodiments of the present disclosure can be implemented as a routine that is stored in memory 902 and executed by the processor 901 to process the signal from the media 907. As such, the computer system is a general-purpose computer system that becomes a specific purpose computer system when executing the routine of the present disclosure.

Although the computer system described in FIG. 9 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method for configuring a computer system having a service delivery workload comprising:
  receiving, by an automatic monitoring agent, a projected system load for a projected server configuration of said computer system, wherein a current server configuration of said computer system comprises a plurality of machines in an interdependent infrastructure forming a queuing system and wherein said projected server configuration differs from said current configuration;
  estimating, by said automatic monitoring agent, a load value of said projected system load and said projected server configuration of said computer system, wherein said load value is determined given a plurality of ticket generation policies describing rules of said automated monitoring agent generating system alert events and system alert tickets, wherein said automatic monitoring agent monitors said current server configuration of said computer system and generates a plurality of system alert tickets dependent on actual load values of said computer system and actual performance values of said computer system, wherein system alert ticket values and system alert ticket volumes are determined from said plurality of system alert tickets;

determining, by said automatic monitoring agent, that said load value of said projected server configuration correlates to said actual performance data of said current server configuration of said computer system;

estimating, by said automatic monitoring agent, said workload of said projected server configuration of said computer system using a correlation model correlating said load value with said system alert ticket volume and said system alert ticket volumes; and adding, by said automatic monitoring agent, at least one machine to said current server configuration of said computer system according to an infrastructure defined by said projected server configuration of said computer system given said workload estimated using said correlation model.

2. The method of claim 1, further comprising collecting, by said automatic monitoring agent, data of said current server configuration of said computer system, said data including overlapping samples of load values, overlapping samples of performance values, overlapping samples of system alert event outputs, system alert ticket values and system alert ticket volumes, wherein collecting the data further comprises collecting configuration values of said current server configuration of said computer system and connectivity in said interdependent infrastructure forming a queuing system.

3. The method of claim 2, further comprising pruning said data to obtain a sub-set of said data.

4. The method of claim 2, further comprising pruning said data to remove at least one of said overlapping samples failing outside of a domain of performance values associated with ticket data.

5. The method of claim 2, further comprising pruning said data to remove at least one of said ticket values determined to be unrelated to said workload given an expected time service said at least one of said ticket values.

6. The method of claim 2, further comprising:
building, by said automatic monitoring agent, a load-to-performance correlation of said load value of said projected server configuration with said actual performance values of said computer system; and
building, by said automatic monitoring agent, a performance-to-workload correlation of said actual performance values of said computer system with said event outputs, said ticket values and said ticket volumes.

7. A computer program product for configuring a computer system having a service delivery workload comprising:
a non-transitory computer readable storage medium having computer readable program code embodied therewith, the computer readable program code comprising:
computer readable program code configured to receive a projected system load for a projected server configuration of said computer system, wherein a current server configuration of said computer system comprises a plurality of machines in an interdependent infrastructure forming a queuing system and wherein said projected server configuration differs from said current configuration;
computer readable program code configured to estimate a load value of said projected system load and said projected server configuration of said computer system, wherein said load value is determined given a plurality of ticket generation policies describing rules of an automated monitoring agent generating system alert events and system alert tickets, wherein said automatic monitoring agent monitors said current server configuration of said computer system and generates a plurality of system alert tickets dependent on actual load values of said computer system and actual performance values of said computer system, wherein system alert ticket values and system alert ticket volumes are determined from said plurality of system alert tickets;
computer readable program code configured to determine that said load value of said projected server configuration load correlates to said actual performance data of said current server configuration of said computer system;
computer readable program code configured to estimate said workload of said projected server configuration of said computer system using a correlation model correlating said load value with said system alert ticket volume and said system alert ticket volumes; and
computer readable program code configured to add at least one machine to said current server configuration of said computer system according to an infrastructure defined by said projected server configuration of said computer system given said workload estimated using said correlation model.

8. The computer program product of claim 7, further comprising computer readable program code configured to collect data of said current server configuration of said computer system, said data including overlapping samples of load values, overlapping samples of performance values, overlapping samples of system alert event outputs, system alert ticket values and system alert ticket volumes, wherein collecting the data further comprises collecting configuration values of said current server configuration of said computer system and connectivity in said interdependent infrastructure forming a queuing system.

9. The computer program product of claim 8, further comprising computer readable program code configured to prune said data to obtain a sub-set of said data.

10. The computer program product of claim 8, further comprising computer readable program code configured to prune said data to remove at least one of said overlapping samples failing outside of a domain of performance values associated with ticket data.

11. The computer program product of claim 8, further comprising computer readable program code configured to prune said data to remove at least one of said ticket values determined to be unrelated to said workload given an expected time service said at least one of said ticket values.

12. The computer program product of claim 8, further comprising:
computer readable program code configured to build a load-to-performance correlation of said load value of said projected server configuration with said actual performance values of said computer system; and
computer readable program code configured to build a performance-to-workload correlation of said actual performance values of said computer system with said event outputs, said ticket values and said ticket volumes.

\* \* \* \* \*